United States Patent [19]
Madsen et al.

[11] 4,081,703
[45] Mar. 28, 1978

[54] ELECTRIC MOTOR HAVING TOOTHED POLE PIECES

[75] Inventors: Elmer W. Madsen, Bristol; Charles W. Hansen, Wolcott, both of Conn.

[73] Assignee: North American Philips Corporation, New York, N.Y.

[21] Appl. No.: 690,080

[22] Filed: May 26, 1976

[51] Int. Cl.² ............................................ H02K 37/00
[52] U.S. Cl. ................................................ 310/49 R
[58] Field of Search ................. 310/49, 156, 168, 162, 310/163, 164

[56] References Cited

U.S. PATENT DOCUMENTS

| | | | |
|---|---|---|---|
| 2,249,029 | 7/1941 | Mullerheim | 310/49 R X |
| 3,293,459 | 12/1966 | Kreuter et al. | 310/49 R |
| 3,343,014 | 9/1967 | Giles | 310/49 R |
| 3,417,270 | 12/1968 | Koegel | 310/49 R |
| 3,535,604 | 10/1970 | Madsen et al. | 310/49 R X |
| 3,601,640 | 8/1971 | Egawa | 310/49 R |
| 3,621,312 | 11/1971 | Palmero | 310/49 R |
| 3,866,104 | 2/1975 | Heine | 310/49 R |

*Primary Examiner*—Mark O. Budd
*Attorney, Agent, or Firm*—Robert S. Smith; Frank R. Trifari

[57] ABSTRACT

An electric motor having a stator with a plurality of pole pieces which are disposed in angularly spaced intervals about the axis of rotation of a cooperating rotor. Each stator pole piece has one or more teeth thereon. Each tooth has an inner peripheral surface which lies on the circumference of a circle having its center on the axis of rotation of the rotor. The teeth on each stator pole piece (which has a plurality of teeth) are spaced with a uniform pitch therebetween and the pitch on one stator pole piece is the same as the pitch on any other stator pole piece. One of the stator pole pieces and an adjacent stator pole piece about the axis of the rotor comprise a pole pair. Each two successive stator pole pieces disposed about the axis of the rotor comprise additional pole pairs. The plurality of teeth on one of the stator pole pieces in each of the pole pairs is shifted with respect to the plurality of teeth on the other stator pole piece in the same pair one half of the tooth pitch and the plurality of teeth on the adjacent pole pieces of adjacent pairs of stator pole pieces are shifted 1/2N of a tooth pitch where N is the number of phases of the motor.

22 Claims, 8 Drawing Figures

| STEP | $S A_F$ | $S B_F$ |
|---|---|---|
| 1 | + − | + − |
| 2 | − + | + | |
| 3 | − + | − + |
| 4 | + − | − + |
| 1 | + − | + − |
| ETC | | |

| 1 | A | C |
|---|---|---|
| 2 | B | C |
| 3 | B | D |
| 4 | A | D |

ELECTRIC MOTOR HAVING TOOTHED POLE PIECES

The invention relates to permanent magnet synchronous motors and particularly to multiphase permanent magnet DC stepping motors and variable reluctance DC stepping motors. The terminology stepping motor and stepper motor is used interchangeably herein.

Multiphase permanent magnet DC stepping motors utilize a unidirectional magnetic field which is attracted to and follows a rotating magnetic field. The unidirectional field in this embodiment of the invention is produced by a permanent magnet forming a part of the motor rotor. If, for example, two phase permanent magnet DC stepping motors have an even number of magnetic poles and a two phase winding with alternate poles being energized by the same phase. When the windings are connected to a source of alternating current, each of the poles will have a first magnetic polarity during one half of the cycle and the opposite polarity during the other half of the cycle. Within either phase of an eight pole motor successive stator poles about the axis of the rotor will be north, south, north, south during one half of the alternating current cycle and in the other half of the alternating current cycle the same poles will become respectively south, north, south, north. The other phase of the winding is 90 electrical degrees out of phase with the first phase. Rotor movement is produced by the unidirectional field being first attracted and then repelled by the change in the polarity of the poles. The rotating speed of the motor using a constant cycle alternating source is varied by mechanical construction features such as the number of stator poles, the number of teeth on each pole, and the number of teeth on the rotor.

In a four phase variable reluctance DC stepping motors of the type shown only two phases are energized at any given time interval. The motor which is provided with DC power continuously seeks to align the rotor in a manner which will minimize the reluctance to the flux passing between the oppositely disposed poles having power applied to them at any one specific time. Such motors are provided with a stator that has a plurality of poles, with each pole having its inner periphery toothed. A winding is inductively associated with each pole and upon its energization will magnetize the pole so that all the pole's teeth will be of the same magnetic polarity. The rotor has an annular portion formed of high permeable material with axially extending peripheral teeth and is substantially axially coextensive with the stator. Flux produced by a stator pole passes through an air gap between the stator and rotor through the rotor and again through the air gap to an oppositely magnetized stator pole so that the teeth of the rotor tend to align themselves with the teeth of the magnetized poles. As the windings of the poles are sequentially energized and deenergized, the alignment follows the pairs of magnetized poles to produce the stepping, rotational movement.

In variable reluctance motors there are at least four poles. Ordinarily the winding of each phase will consist of at least two opposed poles. Each phase is separately energizable and energizing the phase always causes each pole about which the winding extends to have the opposite magnetic polarity. The adjacent phase is similarly constructed with two opposite poles. In an eight pole motor, i.e. two winding sets forming two pairs of adjacent poles, magnetic flux will pass from one pole of one phase to the other pole of the other set and also from the other pole of the one set to the adjacent pole of the other set. The rotor teeth will attempt to align themselves with the magnetized poles to provide the path of least reluctance. By next energizing the third phase winding, while deenergizing the one, there will still be adjacent poles that have opposite magnetic polarities and the rotor will again attempt to align its teeth with those of the magnetized poles, thus producing an incremental movement from the previous position. It will be understood that the switching between pairs of opposed poles is normally accomplished by circuitry external to the stator.

A disadvantage of prior art two phase permanent magnet DC stepping motor is that a counterproductive torque is produced. More particularly, such motors have for finite time intervals in which flux path occur which detract from the total torque produced by the motor. Another disadvantage of prior art structures is that the geometry of the prior art windings necessitates a relatively large diameter stator to allow for a single flux carrying path from more than one phase. Limiting the stator diameter causes the flux path to saturate; thus reducing the motor efficiency.

It is an object of the present invention to provide a permanent magnet DC stepper motor which will have a geometric relationship of the rotor and stator which will avoid significant flux paths which will tend to reduce motor torques.

It is another object of the invention to provide a stator lamination which will permit use of the same stator lamination which a different winding and rotor in a variable reluctance DC stepper motor.

It is still another object of the invention to produce a motor which will not generate any toruqe by flux in a first phase in a pole connected to the second phase.

It is yet another object of the invention to provide a rotor and stator construction which may be operated as a low speed AC synchronous motor or a DC stepper motor having small incremental steps.

Another object of the invention is to provide a motor construction which for a given size will have increased power and efficiency and is smaller than prior art structures.

Still another object is to provide a motor construction that is dynamically balanced by avoiding force on the rotor which would tend to force it to move radially in various directions as the rotor rotates.

It is also an object of the invention to provide such a rotor and stator construction which may be manufactured and assembled with a minimum of cost.

SUMMARY OF THE INVENTION

It will be understood that the invention has application to multiphase and particularly to two phase permanent magnet DC stepping motors having a rotor with two pole pieces. Ordinarily each pole piece will be identical geometrically and magnetically and will each have a plurality of circumferential teeth having a uniform pitch. Such pole pieces are customarily manufactured by either a powder metallurgy process or with laminations and customairly one pole piece will be shifted one half of the tooth pitch with respect to the other. This arrangement is simpler to assemble and manufacture than the alternative arrangement where the stator may be shifted along the axial extent thereof.

Cooperating with the rotor is a stator. Disposed about the stator is a plurality of poles which each have a plurality of teeth thereon. Each of the teeth on each of the poles is uniformly spaced with the same pitch as the pitch of the teeth on the rotor.

In two phase embodiments the plurality of poles on the stator ordinarily will be a multiple of four in number. A pair of these poles consists of two poles that are adjacent and which have opposite polarity an any instant. The teeth on each successive pole of the stator within each pair are shifted with respect to the other teeth on the other pole on the same pair one half of the pitch. It will be understood that the term "shifted" means that the teeth are disposed in displaced relationship from a relationship wherein each tooth is disposed on one of a plurality of radial lines extending from the axis of the stator at equal angular increments.

In one two phase embodiment the first phase has four poles which comprises two adjacent poles and two oppositely disposed adjacent poles. Each of these adjacent poles will be referred to as a pole pair or pair of poles. Within each pole pair at any instant during operation of the motor one pole will have a first polarity and the other will have a second polarity. The second phase in this embodiment also has two pairs of poles with each pair consisting of two adjacent poles. Each pair of poles is oppositely disposed with respect to the other pair of poles. Within any one pair of poles the teeth of one pole will be offset one half of the pitch with respect to the teeth of the other pole. It will be understood that the teeth of the second pole in any pair may be either advanced or retarded with respect to the teeth of the first pole.

Any given pole pair will be disposed adjacent to another pole pair which will be referred to as an adjacent pole pair. One pole of the given pole pair and one pole of the adjacent pole pair will obviously be adjacent. The teeth of the one pole in the adjacent pole pair will be shifted one quarter of the pitch with respect to the one pole in the given pole pair.

The winding for the first phase extends successively around each pole of a first pole pair and then around each pole of an oppositely disposed pole pair. Similarly the winding for the second phase extends through each pole of another pole pair and then around each pole of an oppositely disposed pole pair. In a construction having four poles disposed about an axis there will be two pairs which each consist of two poles. Each pair will be connected to separate phases. The teeth of the second pole in each pair will be shifted one half of the pitch with respect to the teeth of the adjacent pole.

In one form of the invention the axis of each pole is not spaced at uniform angular increments about the axis of the stator. Each pole has uniformly spaced and contoured teeth which are positioned by the pole piece in the symmetric relationship to the pole axis. Accordingly, the axis of the pole will always intersect the pole face (which has the array of uniformly spaced teeth disposed thereon) at the same geometric point. It will be understood that this geometric arrangement facilitates the uniform winding around the poles since the pole face will extend the same amount on each side of the pole axis. It is within the spirit of the invention, of course, to have the teeth on any one pole skewed to one side of the pole axis and still maintain the geometric relationship of the teeth of the rotor and stator described above.

Those skilled in the art will understand that this DC permanent magnet stepping motor may also be operated as an AC synchronous motor with an RC phase shifting network which produces a 90° phase shift.

BRIEF DESCRIPTION OF THE DRAWING

The invention will be better understood by reference to the accompanying drawing in which.

DESCRIPTION OF THE PREFERRED EMBODIMENT

Figure 1:
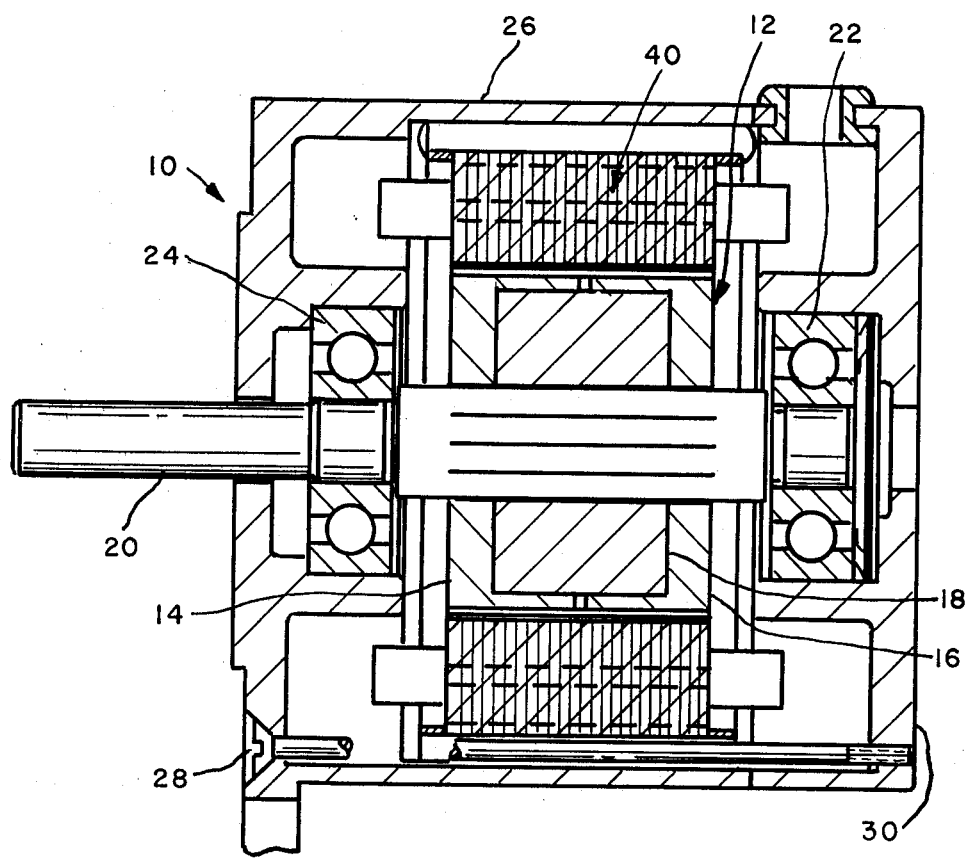
FIG. 1 is a cross-sectional view taken through a vertical plane of a two phase permanent magnet DC stepping motor in accordance with one form of the invention.
Figure 2:
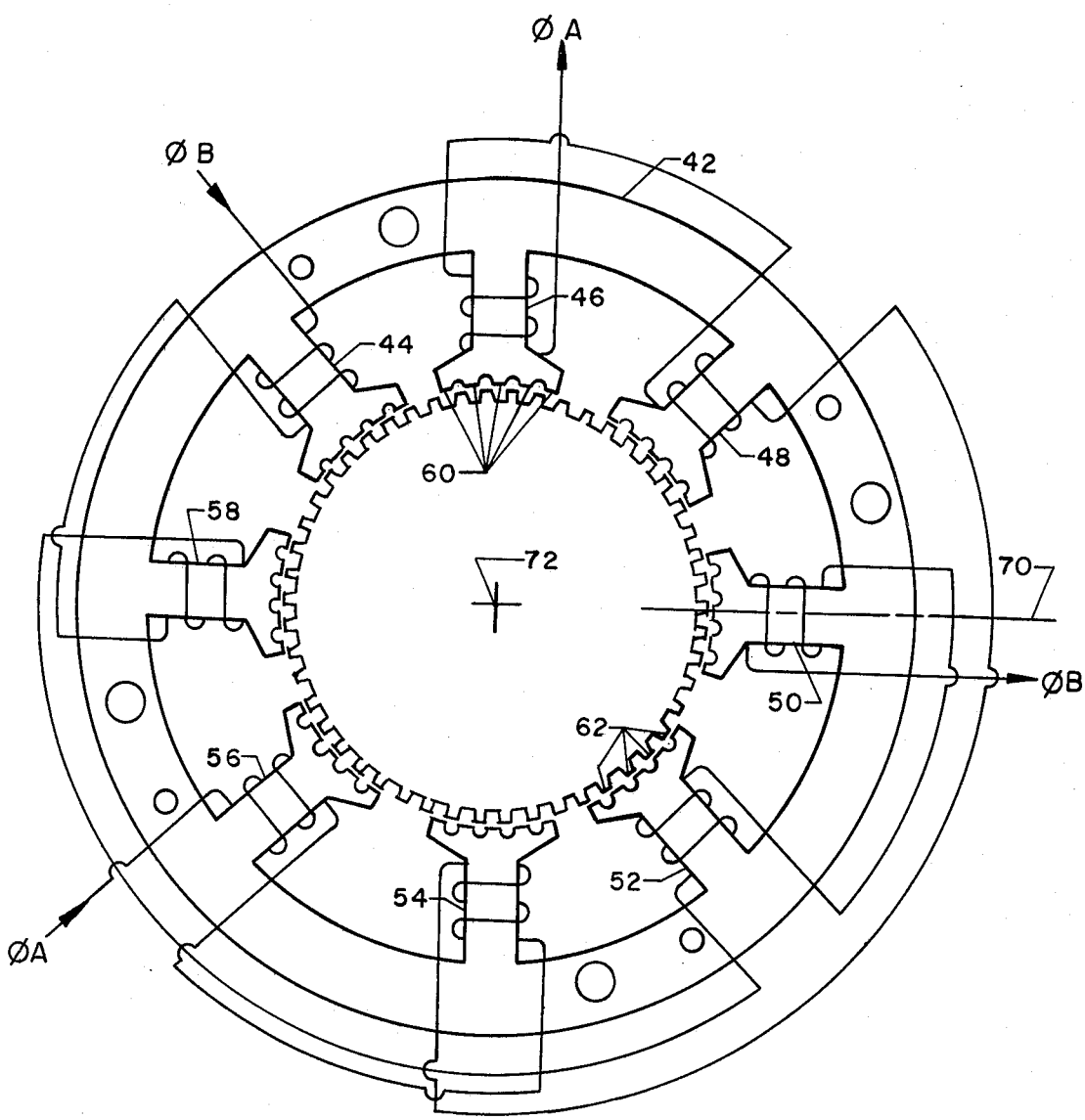
FIG. 2 is an end elevational view of a stator lamination of the motor shown in FIG. 2 with a diagrammatic representation of the winding in that motor.

Referring now to FIGS. 1 and 2 there is shown a permanent magnet DC stepping motor 10 in accordance with one form of the invention. The rotor 12 includes two discreet pole pieces 14 and 16 which are disposed about a permanent magnet 18 on a central shaft 20. The shaft 20 is carried by bearings 22 and 24 in housing 26 and end cap 30. Bolts 28 (one shown) secure the housing 26 to the end cap 30.

The stator 40 comprises a plurality of discreet laminations 42 in the form shown there are 8 poles or pole pieces, 44, 46, 48, 50, 52, 54, 56 and 58. Each lamination 42 will be identical geometrically and magnetically and will be disposed in aligned relationship. The diagrammatic representation of FIG. 2 shows phase A extending between a pair of poles which are adjacent 46, 48 and which are wound in a manner which will result in their having opposite magnetic polarity at any instant of time. Each pole in one form has five teeth 60 thereon which are uniformly dimensioned and contoured with a fixed pitch therebetween. In other embodiments the number of teeth on one stator pole piece may be any number from one to a number limited only by size limitations. Within each pair, such as the pair 46, 48 the teeth on the successive pole of the same pair are shifted with respect to the teeth on the other pole of the same pair one-half of the pitch. As used herein the term "shifted" means the teeth are disposed in displaced relationship from a relationship wherein each tooth is disposed on a plurality of radial lines extending from the axis of the stator at equal angular increments. Phase A will also consist of poles 54 and 56. At any instant of time the poles 54 and 56 will have opposite magnetic polarity as do the poles in the pole pair 46,48.

The second phase in the illustrated embodiment shown also has two pairs of poles 50, 52 and 44, 58. Each pair is oppositely disposed with respect to the other pair of poles. Again within any one pair of poles, the teeth of one pole will be offset or shifted one-half of the pitch with respect to the teeth of the other pole. The pair 50, 52 is adjacent to the pole pair 46, 48. More particularly, the pole 48 is adjacent to the pole 50 and the teeth of the pole 50 will be shifted 1/2N or one quarter of the pitch with respect to the pole 48 since N is the number of phases in the motor. It will be understood that the term "pitch" as used herein refers to the pitch between teeth on any one pole and that the tooth pitch is uniform on any one pole. The pitch of the teeth on any one pole is identical to the pitch of the rotor teeth 62 as will be seen by reference to the drawing which shows rotor 12 and the individual poles 44–58 of the stator 40.

Each pole 44–58 has a pole axis 70 which bi-sects the pole and extends from the stator axis 72 in a radial direction. One such pole axis 70 is shown in FIG. 2 with respect to the pole 50. In the embodiment shown in FIG. 2, the axis of the poles 44–58 are not spaced at uniform angular increments about the axis 72 of the stator 40. The teeth 60 of each pole are disposed in symmetric relationship with respect to the pole axis of the pole on which they are disposed. The terminology "pole axis" as used herein refers to a radial line extending from the stator axis and which bi-sects a symmetrical pole. Because the teeth 60 of one pole are shifted with respect to another pole, it will be understood that the angular spacing between poles 44–58 is non-uniform. This arrangement facilitates the uniform winding around the individual poles 44–58. Since the pole face of each pole which comprises the five teeth 60 will extend the same amount on each side of the pole axis, the winding may be manufactured more easily in this fashion. It will be understood that the pole face which consists of the five pole pieces 60 may be skewed to one side to accomplish the necessary shifting of teeth in any one pole 44–58 and the poles 44–58 may be positioned at equal angular increments around the stator axis 72.

Figures 3, 6, 7:
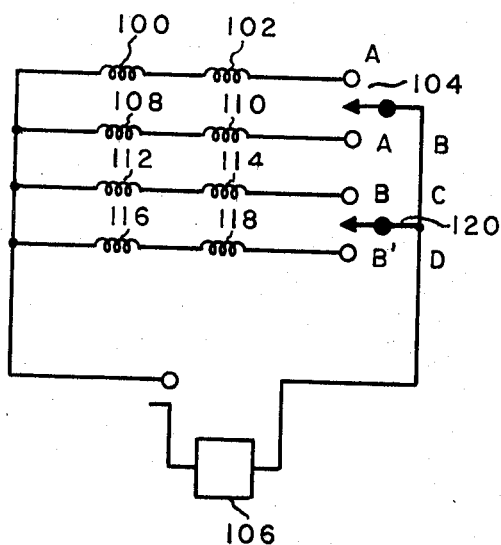
FIG. 3 is a table of a typical switching sequence for the motor of FIG. 1.
FIG. 6 is a diagrammatic representation of the wiring for the motor of FIG. 4.
FIG. 7 is a table showing a typical switching sequence for the motor of FIG. 4.

In operation as best seen in FIG. 3, the four step sequence is shown which includes the polarity of the individual windings within each pair of each phase during each of the steps. During step 1 for example phase A which consists of poles 46, 48, 54 and 56 will have current flow in a first direction as indicated by the plus and minus symbols to indicate one direction of current flow, at the same time interval the phase B which consists of poles 44, 58, 52 and 50 will have the same direction of flow. The sequential reversals of current flow in one phase during each additional step will be apparent to those skilled in the art. The diagram of FIG. 3, it will be understood is for a single winding which requires current reversal to accomplish the stepping action. It will be understood that a bifilar winding may also be used and that in such windings the current reversal will not be necessary.

In the motor shown in FIGS. 1 and 2 it will be understood that the incremental steps are 1.8 degrees because there are 50 teeth on the rotor and there is a four step sequence for running the motor. In the four step sequence the phases as shown by the diagram are successively one negative and one positive, both negative, one positive and one negative, and both positive. The four step sequence times the number of teeth results in two hundred increments per rotation or 1.8°. Steps of 0.9° may be obtained with the same number of teeth by including an 8 step sequence of energization which utilizes zero current steps which are successively both positive, zero and positive, negative and positive, negative and zero, both negative, zero and negative, positive and negative, positive and zero, and both positive.

Figure 4:
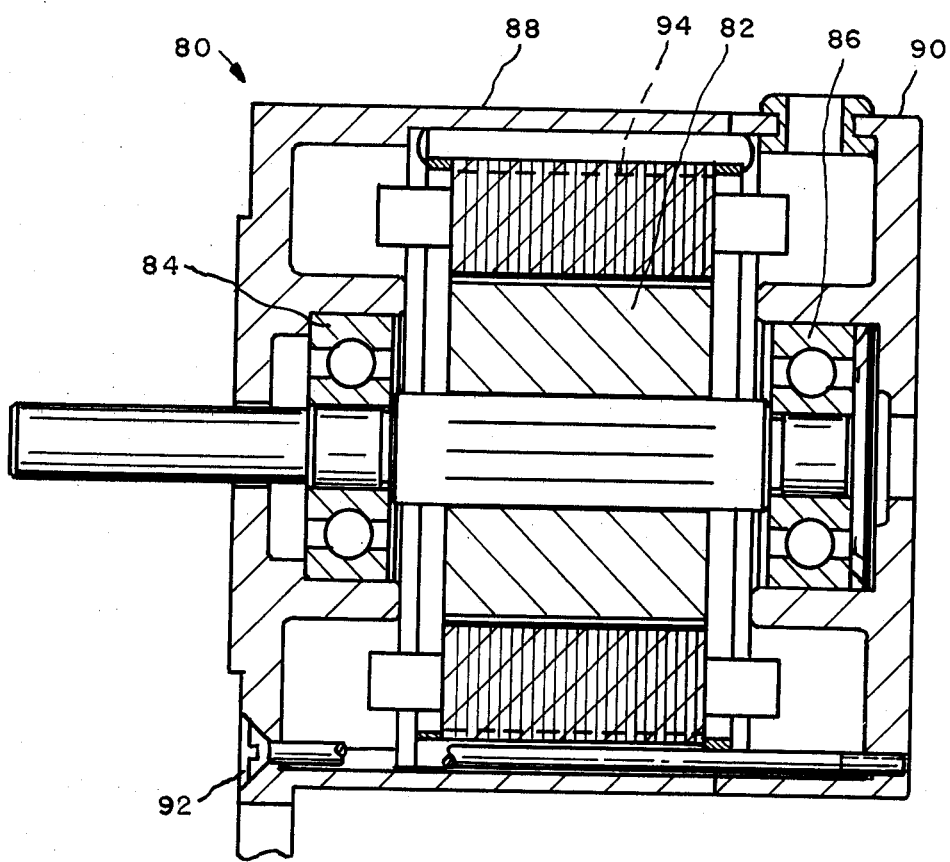
FIG. 4 is a cross-sectional view taken through a vertical plane of a variable reluctance motor in accordance with another form of the invention.
Figure 5:
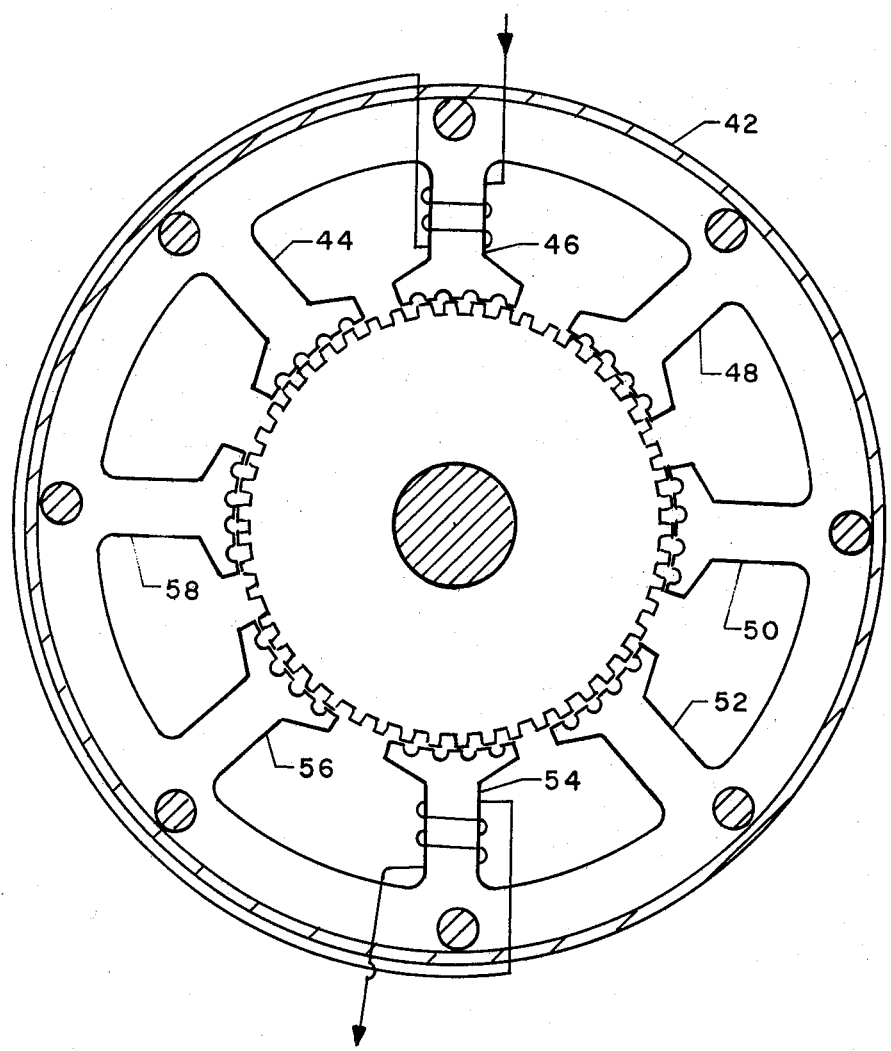
FIG. 5 is an end elevational view of the stator of the motor shown in FIG. 4 with a diagrammatic representation of a typical winding for that motor.

Referring now to FIGS. 4 and 5 there is shown a variable reluctance motor 80 which in a manner similar to the motor shown in FIG. 1 includes a rotor 82 which is conventional in construction. Bearings 84 and 86 carry the rotor within housing 88 and end cap 90. Bolts 92 (one shown) secure the end cap 90 to the housing 88. The stator 94 consists of a plurality of discreet laminations 42 which are identical to the laminations shown in FIG. 2. The wiring for the phases of the variable reluctance embodiment of the motor may take various forms. The form shown in FIG. 5 includes a single phase embodiment which includes two opposite poles. In this form of the invention additional phases will consist of two opposed poles wound in the same manner illustrated. Accordingly, the poles 46, 54 will have the opposite polarity rather than the same polarity. Each pole of the motor 80 will always have the same polarity. In an alternate embodiment flux may flow from one pole to another phase and specifically to a pole of another phase.

Referring to FIGS. 6 and 7 there is shown a diagrammatic representation of the wiring for the variable reluctance motor which includes windings 100 and 102 of phase A which are selectively energized by switch 104 from a power source 106. Similarly Phase B consists of windings 108 and 110 which are also selectively energized by switch 104.

Phase C consists of windings 112 and 114. Phase D consists of windings 116 and 118. A switch 120 selectively applies power to phase C or phase D.

As best seen in FIG. 7 the four step sequence which results in the same 1.8° increments referred to above consists of respectively applying power to phase A and C, phase B and C, phase B and D and phase A and D. In a manner similar to that described for the DC permanent magnet stepping motor the angular increments may be changed to 0.9°.

Figure 8:
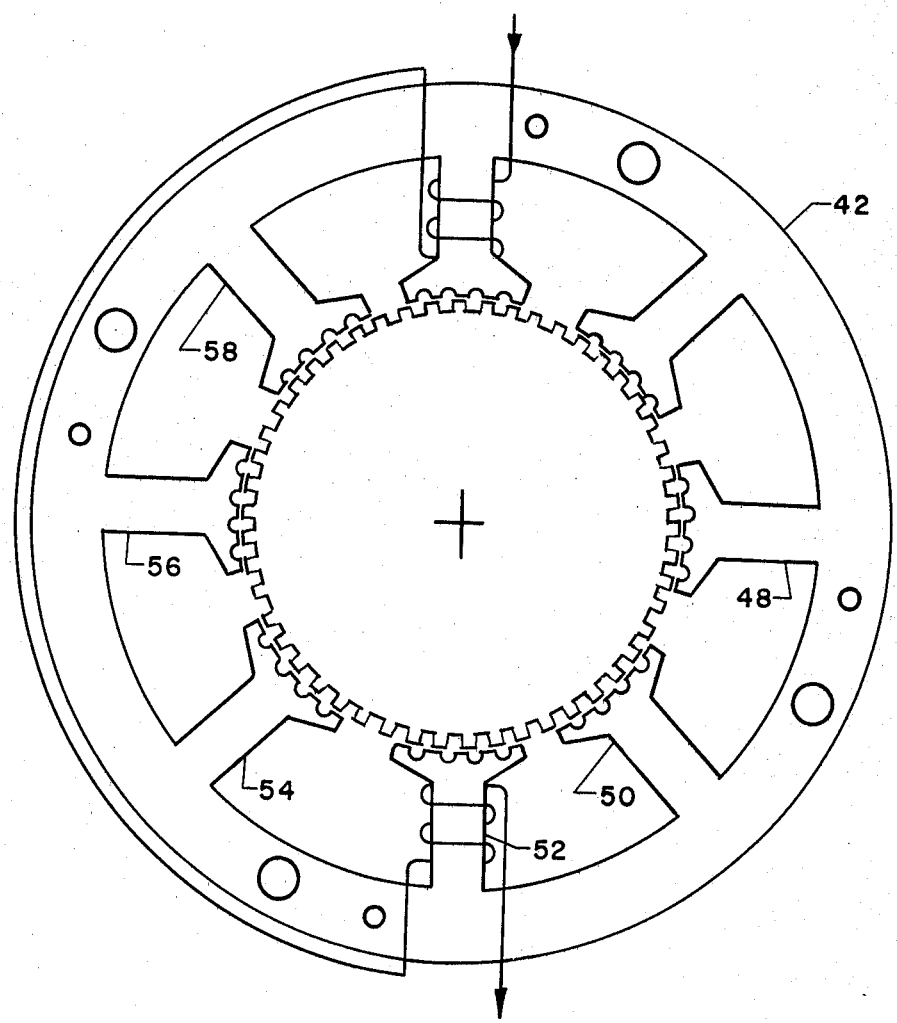
FIG. 8 is a diagrammatic representation of another winding for a variable reluctance motor in accordance with the invention.

FIG. 8 shows another form of winding for the variable reluctance motor in accordance with the invention in which like numerals are used to designate like elements of the apparatus. In this form of the invention opposed poles are energized to be of the same polarity.

It will be understood by those skilled in the art that in various embodiments the number of teeth on one pole piece need not be the same as every other pole piece even within the same pole pair. Any pole piece may have less than a whole tooth disposed thereon such as one half of a whole tooth.

It will be seen that in the DC stepping motor embodiment the flux path in any one phase does not extend to any pole of another phase and so the torque produced by the motor in advancing from one discrete position to another discrete position is greater than in prior art motors using the same electric power. Such motors in accordance with the invention have room for both or other fastening devices intermediate the adjacent pole pairs of different phases which do not compromise the operating efficiency of the motor as in small prior art DC stepping motors.

We claim:

1. An electric motor comprising a rotor and a cooperating stator having a multiple of four stator pole pieces which are disposed at angularly spaced intervals about the axis of rotation of said rotor, each stator pole piece having a plurality of teeth thereon, said teeth having an inner peripheral surface which lies on the circumference of a circle having its center on the axis of rotation of the rotor, said teeth being spaced on each stator pole piece with a uniform pitch therebetween, the pitch on one stator pole piece being the same as the pitch on any other stator pole piece, one of said stator pole pieces and an adjacent stator pole piece about the axis of the rotor comprising a pole pair, each two successive stator pole pieces disposed about the axis of the rotor comprising additional pole pairs, said plurality of teeth on one of said stator pole pieces in each of said pole pairs being shifted with respect to said plurality of teeth on the other stator pole piece of the same pole pair one-half of said pitch.

2. The apparatus as described in claim 1 wherein the angular spacing between said stator pole pieces about the axis of said rotor is uniform.

3. The apparatus as described in claim 2 wherein said plurality of teeth on at least some of said stator pole pieces is skewed with respect to the pole axis of the pole piece of which they are a part.

4. The apparatus as described in claim 1 wherein said plurality of teeth on any one stator pole piece is disposed in symmetric relationship with respect to the pole axis of the stator pole piece of which they are part and the angles between said stator pole pieces measured from the axis of rotation of said rotor are different.

5. A motor as described in claim 1 wherein said rotor comprises two axially spaced cylindrical rotor pole pieces formed on their respective peripheral surfaces with axially extending teeth of uniform pitch, the teeth on one of said rotor pole pieces being angularly displaced about the rotor axis by one-half of the tooth pitch relative to the teeth on the other of said rotor pole pieces, the spacing of said teeth on said rotor and the spacing of said teeth on each stator pole piece being the same.

6. The apparatus as described in claim 5 wherein said motor includes a winding having a first phase which extends around each pole piece of said first pole pair and each pole piece of an oppositely disposed second pole pair, said winding when connected to an associated source of alternating current providing different polarity on the two poles said first pole pair at some instant in time and simultaneously providing a different polarity to each pole of said second pole pair at the same instant in time, opposite poles in opposite pairs having the same polarity at said instant in time.

7. The apparatus as described in claim 6 wherein said stator pole pieces include two adjacent stator pole pieces which are adjacent to said first pole pair and which comprise a third pole pair, one of said stator pole pieces in said third pair being shifted one-quarter of said pitch with respect to one pole of said first pole pair.

8. The apparatus as described in claim 7 wherein said motor includes a phase winding which extends around each stator pole piece of said third pole pair and around each of two stator pole pieces which are oppositely disposed with respect to said third pole pair.

9. An electric motor comprising a rotor and a cooperating stator having a plurality of pole pieces, said plurality of pole pieces being a multiple of twice the number of phases in said motor, said pole pieces being disposed at angularly spaced intervals about the axis of rotation of said rotor, each stator pole piece having a plurality of teeth thereon, said teeth having an inner peripheral surface which lies on the circumference of a circle having its center on the axis of rotation of the rotor, said teeth being spaced on each stator pole piece with a uniform pitch therebetween, the pitch on one stator pole piece being the same as the pitch on any other stator pole pieces and an adjacent stator pole piece about the axis of the rotor comprising a pole pair, each two successive stator pole pieces disposed about the axis of the rotor comprising additional pole pairs, said plurality of teeth on one of said stator pole pieces in each of said pole pairs being shifted with respect to said plurality of teeth on the other stator pole piece of the same pole pair one-half of said pitch.

10. The apparatus as described in claim 9 wherein said plurality of teeth on said one of said stator pole pieces in each of said pole pairs is shifted by said pitch divided by a number equal to twice the number of phases in the motor.

11. The apparatus as described in claim 9 wherein the angular spacing between said stator pole pieces about the axis of said rotor is uniform.

12. The apparatus as described in claim 10 wherein said plurality of teeth on at least some of said stator pole pieces is skewed with respect to the pole axis of the pole piece of which they are a part.

13. The apparatus as described in claim 10 wherein said plurality of teeth on any one stator pole piece is disposed in symmetric relationship with respect to the pole axis of the stator pole piece of which they are part and the angles between said stator pole pieces measured from the axis of rotation of said rotor are different.

14. A motor as described in claim 10 wherein said rotor comprises two axially spaced cylindrical rotor pole pieces formed on their respective peripheral surfaces with axially extending teeth of uniform pitch, the teeth on one of said rotor pole pieces being angularly displaced about the rotor axis by one-half of the tooth pitch relative to the teeth on the other of said rotor pole pieces, the spacing of said teeth on said rotor and the spacing of said teeth on each stator pole piece being the same.

15. The apparatus as described in claim 14 wherein said motor includes a winding having a first phase which extends around each pole piece of said first pole pair and each pole piece of an oppositely disposed second pole pair, said winding when connected to an associated source of alternating current providing different polarity on the two poles of said first pole pair at some instant in time and simultaneously providing a different polarity to each pole of said second pole pair at the same instant in time, opposite poles in opposite pairs having the same polarity at said instant in time.

16. The apparatus as described in claim 15 wherein said motor includes a second phase winding which extends around each stator pole piece of said third pole pair and around each of two stator pole pieces which are oppositely disposed with respect to said third pole pair.

17. An electric motor comprising a rotor and a cooperating stator having a plurality of pole pieces, said plurality being a multiple of twice the number of phases in said motor, said pole pieces being disposed at angularly spaced intervals about the axis of rotation of said rotor, each stator pole piece having an inner peripheral surface which lies on the circumference of a circle having its center on the axis of rotation of the rotor, one of said stator pole pieces and an adjacent stator pole piece about the axis of the rotor comprising a pole pair, each two successive stator pole pieces disposed about the axis of the rotor comprising additional pole pairs, said inner peripheral surface on one of said stator pole pieces in each of said pole pairs being shifted with respect to said inner peripheral surface on the other stator pole piece of the same pole pair one-half of said pitch.

18. The apparatus as described in claim 17 wherein the angular spacing between said stator pole pieces about the axis of said rotor is uniform.

19. A motor as described in claim 17 wherein said rotor comprises two axially spaced cylindrical rotor pole pieces, each being formed on their respective peripheral surfaces with axially extending teeth of uniform pitch, the teeth on one of said rotor pole pieces being angularly displaced about the rotor axis by one-half of the tooth pitch relative to the teeth on the other of said rotor pole pieces, the spacing of said teeth on said rotor and the spacing of said teeth on each stator pole piece being the same.

20. The apparatus as described in claim 19 wherein said motor includes a winding having a first phase which extends around each pole piece of said first pole pair and each pole piece of an oppositely disposed second pole pair, said winding when connected to an associated source of alternating current providing different polarity on the two poles of said first pair at some instant in time and simultaneously providing different polarity to each pole of said second pole pair at the same instant in time, opposite poles in opposite pairs having the same polarity.

21. The apparatus as described in claim 20 wherein said stator pole pieces include two adjacent stator pole pieces which are adjacent to said first pole pair and which comprise a third pole pair, one of said stator pole pieces in said third pair having an inner peripheral surface shifted one-quarter of said pitch with respect to one pole of said first pole pair.

22. The apparatus as described in claim 7 wherein said motor includes a phase winding which extends around each stator pole piece of said third pole pair and around each of two stator pole pieces which are oppositely disposed with respect to said third pole pair.

* * * * *